United States Patent
Clemons et al.

(10) Patent No.: US 7,142,383 B2
(45) Date of Patent: Nov. 28, 2006

(54) ULTRA FAST BACKUP (UFB) TRACK CONCEPT AND METHOD FOR RECORDING SAME

(75) Inventors: Gregory R. Clemons, Dothan, AL (US); Steven A. Tice, Dothan, AL (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 216 days.

(21) Appl. No.: 10/930,799

(22) Filed: Sep. 1, 2004

(65) Prior Publication Data

US 2006/0044665 A1    Mar. 2, 2006

(51) Int. Cl.
G11B 5/02 (2006.01)
G11B 5/09 (2006.01)

(52) U.S. Cl. .............................. 360/55; 360/48; 360/64
(58) Field of Classification Search ..................... None
See application file for complete search history.

(56) References Cited

U.S. PATENT DOCUMENTS

| | | |
|---|---|---|
| 4,040,109 A | 8/1977 | Kryltsov |
| 4,414,593 A | 11/1983 | Miller |
| 4,763,210 A | 8/1988 | Grant |
| 4,858,039 A | 8/1989 | Mintzlaff |
| 4,985,787 A | 1/1991 | Kikuchi et al. |
| 5,196,969 A | 3/1993 | Iwamatsu |
| 5,270,890 A | 12/1993 | Katou |
| 5,321,566 A | 6/1994 | Grant |
| 5,373,485 A | 12/1994 | Hogan |
| 5,432,652 A | 7/1995 | Comeaux |
| 5,602,694 A | 2/1997 | Miles |
| 5,629,815 A | 5/1997 | Cheatham |
| 5,726,826 A | 3/1998 | Miles |
| 5,739,796 A | 4/1998 | Jasper et al. |
| 5,898,552 A | 4/1999 | Clemons |
| 5,923,508 A | 7/1999 | Clemons |
| 5,940,254 A | 8/1999 | Clemons |
| 5,969,912 A | 10/1999 | Cope |
| 5,998,975 A | 12/1999 | Tada |
| 6,105,104 A | 8/2000 | Guttmann |
| 6,108,168 A | 8/2000 | Clemons |
| 6,137,659 A | 10/2000 | Warmenhoven |
| 6,138,201 A | 10/2000 | Rebalski |
| 6,154,334 A | 11/2000 | Pine |
| 6,182,191 B1 | 1/2001 | Fukuzono |
| 6,203,884 B1 | 3/2001 | Sato |
| 6,288,463 B1 | 9/2001 | Tada |
| 6,301,067 B1 | 10/2001 | Takayama |

(Continued)

OTHER PUBLICATIONS

"AIT FAQs", http://www.aittape.com/ait-faq.html. Feb. 16, 2004.

(Continued)

Primary Examiner—Andrea Wellington
Assistant Examiner—Dan I Davidson
(74) Attorney, Agent, or Firm—Rader Fishman & Grauer; Ronald P. Kananen (57) ABSTRACT

A recording/playback recording medium comprising an elongated, flexible recording/playback medium having a predetermined width and a predetermined length, together defining a recording/playback area capable of providing a plurality of elongated recording/playback tracks; and information located on at least two tracks, a first track being recorded from the beginning of the first track in a first direction until the track is filled, a second track being recorded in a second opposite direction, the tracks being partitioned to define sectors having identifiable locations, the first, second, and subsequent tracks if necessary being recorded in a serpentine manner, the information recorded on the tracks being recorded by a helical scan.

11 Claims, 8 Drawing Sheets

U.S. PATENT DOCUMENTS

| | | |
|---|---|---|
| 6,312,785 B1 | 11/2001 | Sato |
| 6,319,325 B1 | 11/2001 | Hiratsuka |
| 6,391,423 B1 | 5/2002 | Sato |
| 6,425,042 B1 | 7/2002 | Ikeda |
| 6,433,953 B1 | 8/2002 | Taki |
| 6,480,983 B1 | 11/2002 | Noda |
| 6,580,576 B1 | 6/2003 | Takayama |
| 6,618,795 B1 | 9/2003 | Chan |
| 6,624,959 B1 | 9/2003 | Takayama |
| 6,624,961 B1 | 9/2003 | Takayama |
| 6,658,195 B1 | 12/2003 | Senshu |
| 6,661,394 B1 | 12/2003 | Choi |
| 6,674,596 B1 | 1/2004 | Takayama |
| 6,992,847 B1 | 1/2006 | Clemons et al. |
| 2002/0105753 A1 | 8/2002 | Hoge |
| 2003/0234998 A1 | 12/2003 | Magnusson |

OTHER PUBLICATIONS

"Memory in Cassette", http://wwww.qualstar.com/146104.htm. Feb. 16, 2004.

ULTRA FAST BACKUP (UFB) TRACK CONCEPT AND METHOD FOR RECORDING SAME

CROSS REFERENCE TO RELATED APPLICATIONS

This application is related to the subject matter of U.S. patent application Ser. No. 10/930,904, directed to a linear sliding scanner used to achieve the high-density recording pattern on the ultra fast backup recording medium according to this disclosure, and U.S. patent application Ser. No. 10/930,763, now U.S. Pat. No. 6,992,847 issued Jan. 31, 2006, directed to a spool cartridge for operatively housing the ultra fast backup recording medium recorded in the manner presented in this disclosure.

BACKGROUND OF THE INVENTION

1. Technical Field of the Invention

This invention relates generally to a recording medium, such as a tape, and preferably an Advanced Intelligent Tape ("AIT"), for use in an Ultra Fast Backup ("UFB") format in a fast access data storage system. More particularly, this invention relates to a method and apparatus for recording on a recording medium using a helical scan track write/read technique with a serpentine track pattern to increase the data capacity toward one Terabyte. Still more particularly, this invention relates to a linear sliding scanner with a read/write head stack for performing the helical scan serpentine recording and a method for using the same. Finally, this invention relates to a UFB offset spool cartridge for operatively housing the UFB format recording medium according to the present invention, and a method for loading the same into a tape drive apparatus.

2. Brief Discussion of the Related Art

Currently-available high density recording technology provides high-density, large capacity recording in 8 mm cartridges that are much smaller than other data cartridge formats. AIT cartridges are available that feature a built-in flash memory chip, such as a remote, non-contact, Memory in Cassette ("MIC") system, for providing key information directed to a drive for the cartridge. Prior efforts by the assignees of this invention have expanded use of the AIT cartridge with the MIC chip to improve reliability, error prediction, and performance in recording and retrieving data on partitioned tape. An example of the use of MIC technology is shown in U.S. Pat. No. 6,611,394. Associated MIC hardware includes a multi-pin interface to the drive or other external connection to store and retrieve selected information directly from the chip to provide real time customer applications.

MIC information consists of data written at the time of cartridge manufacture when the media is first loaded into an AIT drive, portions of the media updated as a part of a recording sequence, and portions of the media that can be written directly by a user's application. A net result is improved access to data when used in conjunction with tape partitioning, reducing, for example, access time up to 50 percent as compared to conventional methods. U.S. Pat. No. 6,674,596, U.S. Pat. No. 6,624,959, and U.S. Pat. No. 6,301,067 are examples of the use of a solid-state memory control of partitioned tape so that it is not necessary to rewind a tape to the beginning when it is desired to record new data.

A current version of AIT cartridges, known as the AIT-3 (a trademark of Sony) is able to hold 100 GB native and up to 260 GB of compressed data, due in part to a use of helical scan recording technology.

Advanced Metal Evaporated ("AME") is a tape formulation used in AIT installations. Its key characteristics include a 100% pure cobalt magnetic layer design, the absence of binder material to prevent tape head contamination, and a Diamond Like Carbon ("DLC") protective coating for extreme durability. AME also permits very high-density magnetic recording, thereby allowing the AIT family roadmap to reach large capacity levels.

It remains, however, an overall aim in the art to improve recording capability, such as from 100 GB to a target of 1 Terabyte, a 10 fold increase, building on the technology discussed above, and to increase the speed of access and retrieval of data.

Efforts are known that propose the use of serpentine recording patterns, such as in the multi-track recording technique discussed in U.S. Pat. No. 6,154,334 to Pine, as a time-saving traversal pattern. However, that serpentine traverse has not been previously used in conjunction with helical scanning techniques on flexible recording media.

It is an additional problem in this technology to provide a helical scan recording/playback device capable of achieving a serpentine traverse of the recording media, particularly when the recording media is a flexible media such as a recording tape.

SUMMARY OF THE INVENTION

Directed to achieving the foregoing objectives of the invention, and improving a data cartridge according to the prior art, this invention relates to a recording medium, such as an elongated tape and preferably an AME tape, for a cartridge, preferably an AIT cartridge. The recording medium has a plurality of elongated tracks parallel to a center track of the medium on opposite sides wherein the tracks are respectively odd and even numbered. In the tape, a plurality of partitions are formed so that a retrievable address for stored data can be easily located, preferably by use of an MIC chip. Recorded data on the tape is recorded by a helical scan on a track in a serpentine fashion, i.e. a scan of a "0" track in a first direction from the beginning of the tape to the end of the tape, a scan of a "1" track in an opposite direction, a scan of a "2" track again in the first direction, a scan of a "3" track again in the opposite direction, and so forth.

Figure 2A:
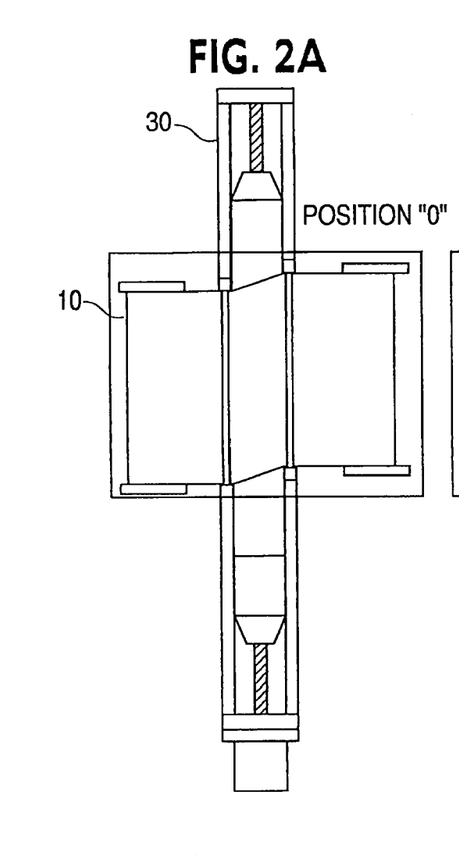
FIG. 2A is a first longitudinal scan at a track position "0"
Figure 2B:
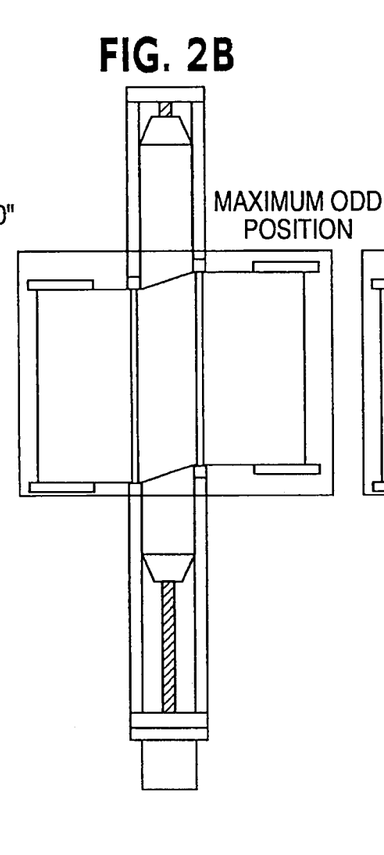
FIG. 2B is a depiction of a longitudinal scan at a maximum odd position near a first side of the tape.
Figure 2C:
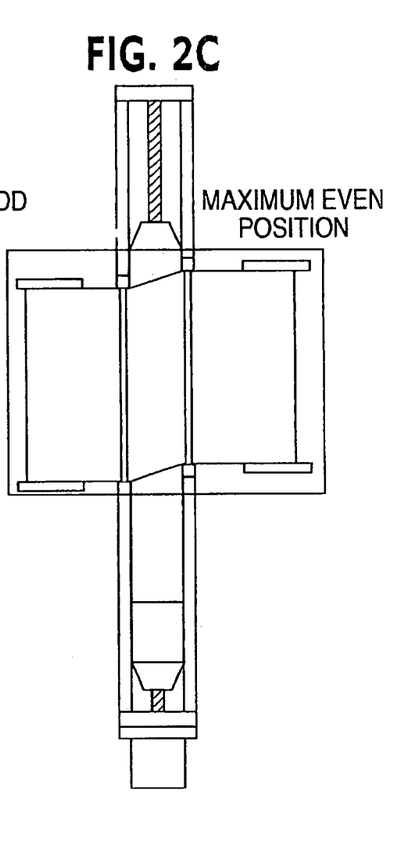
FIG. 2C is a depiction of a longitudinal scan at a maximum even position near a second, opposite side of the tape.
Figure 3:
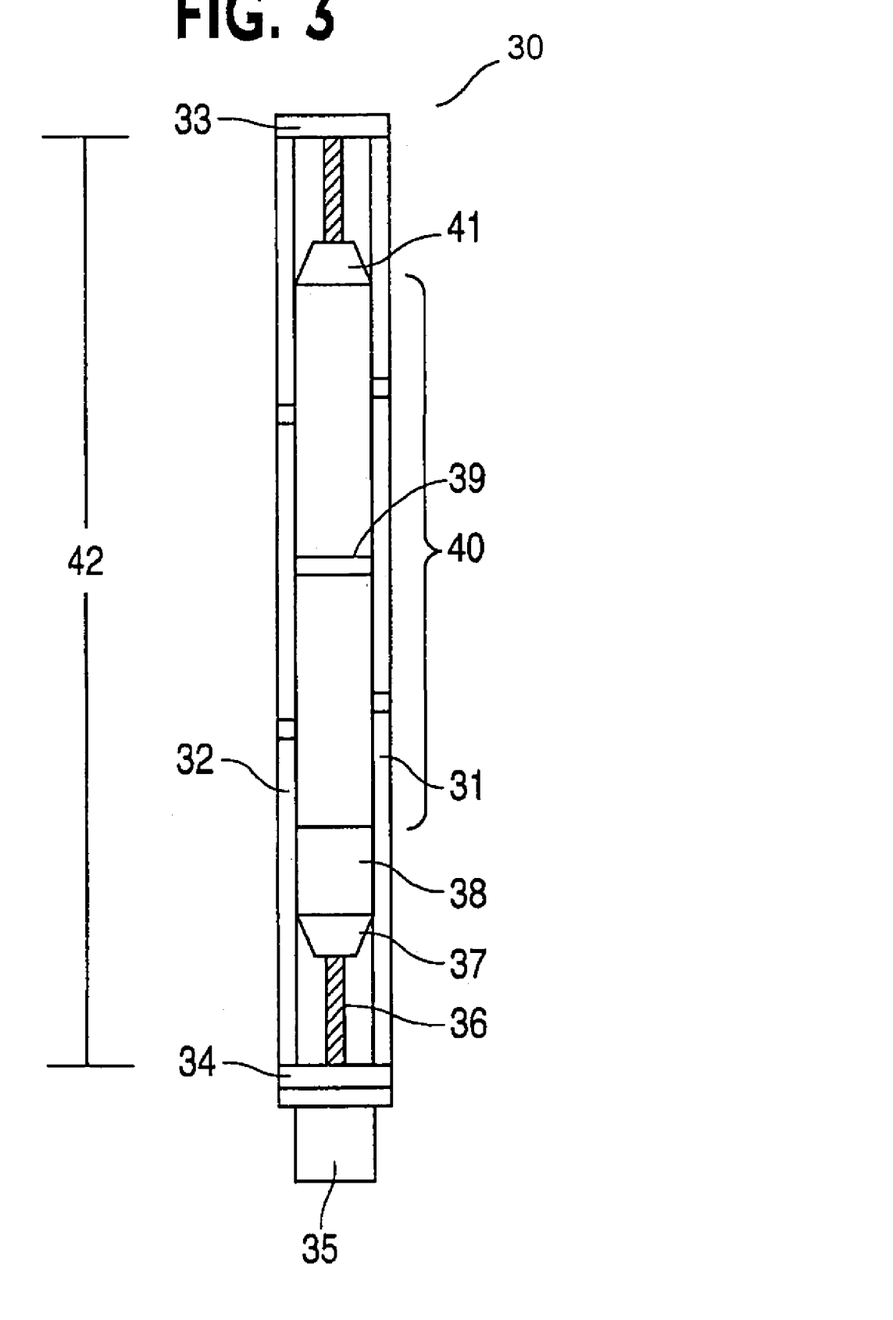
FIG. 3 is a top view of a linear slide device with a scanner/drum assembly for achieving the recording/playback patterns shown in FIGS. 1 and 2.
Figure 4:
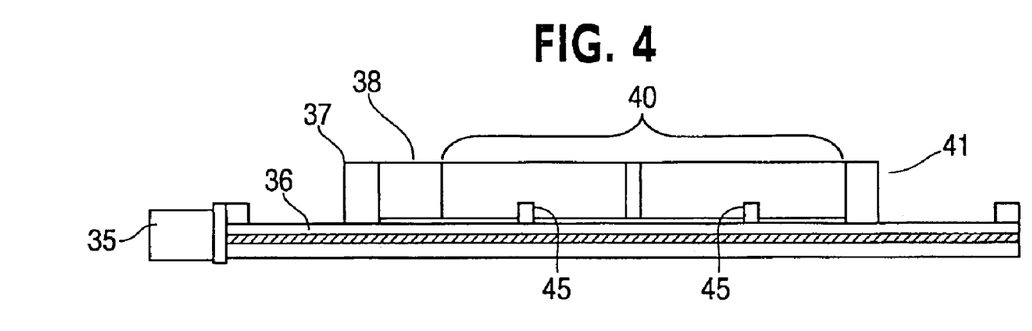
FIG. 4 is a side view of the linear slide device and scanner/drum assembly of FIG. 3 showing a tape guide datum position.
Figure 5:
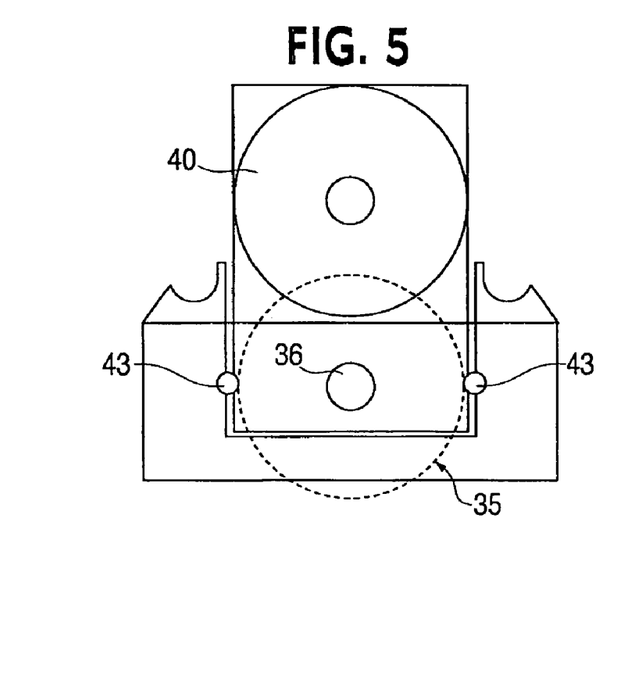
FIG. 5 is an enlarged end view of the linear slide device of FIG. 3 showing in diagrammatic form the essential components of the structure for achieving the linear sliding needed for both helical scanning and serpentine tracking.

A feature of the invention relates to a linear scanning member supporting at least one recording/playback head stack, with a scanner/drum assembly for achieving the helical scan and serpentine recorded configurations on the tape. The linear sliding scanner is best seen in FIGS. 3, 4 and 5, while the recording function is shown in FIGS. 2A, 2B, and 2C utilizing the linear sliding scanner for recording on the tape.

Another feature of the invention relates to a recording/playback recording medium, comprising an elongated, flexible recording/playback medium having a predetermined width and a predetermined length, together defining a recording/playback area capable of providing a plurality of elongated recording/playback tracks. Information is located on at least two tracks, a first track being recorded from the beginning of the first track in a first direction until the track is filled, the second track being recorded in a second opposite direction, the tracks being partitioned to define sectors having identifiable locations. The first, second, and subsequent tracks if necessary are recorded in a serpentine manner, and the information recorded on the tracks is recorded by a scanner/drum assembly using a helical scan technique.

The first track is located at about the longitudinal center of the flexible medium, the second track is located toward a first odd side of the first track, a third track is located on a side opposite the first track toward a second even side of the first track, and so forth for a total number of tracks in the area. A remote MIC chip is provided for identifying sectors on the flexible medium for addressing data for recording and/or playback.

According to another feature of the invention, means are provided for recording on selected tracks of the medium, the recording means including a recording/playback head stack and means for incrementing the head stack relative to a preselected recording track on the flexible recording medium. Means are also provided for recording/playback of helical scan signals on the preselected recording track. Still further, means capable of recording/playback on any track between edges of the flexible recording medium are also provided Another feature of the invention relates to a linear sliding apparatus and a scanner/drum assembly, the linear sliding apparatus being capable of linearly sliding transversely relative to the flexible recording medium. The scanner/drum assembly is capable of helical recording on a preselected track. A first motive means for incrementing the scanner/drum assembly relative to the preselected track, and a second motive means are included for driving the scanner/drum assembly for recording and/or playback.

Another feature of the invention relates to a method of recording information on a recording/playback medium, comprising the steps of providing an elongated flexible recording/playback medium having a predetermined width and a predetermined length together defining a recording/playback area having a plurality of tracks; recording information on at least two tracks in the area, including the steps of recording on a first track from a beginning of the tape end to an end of the tape in a first direction, and recording on a second track from an end of the tape toward the beginning of the tape in a second, opposite direction, the tracks being partitioned to define sectors having identifiable locations. The recording/playback further includes a step of helical scan recording on preselected tracks. Still further, the method includes a step of selecting an address of the identifiable locations using a remote MIC chip. Another feature of the method includes additional steps of helical scan recording in an additional plurality of tracks on the flexible recording medium in a serpentine manner.

Another feature of the present invention relates to an apparatus for helical scan recording/playback from preselected tacks on a flexible tape medium, comprising a linear slide structure capable of movement transversely relative to a longitudinal direction of the tape medium, the linear slide structure including a scanner/drum capable of sliding movement relative to a longitudinal direction of the tape medium between opposed edges of the tape medium defining a recording area, the scanner/drum having a head stack for helical scan recording/playback of the preselected tracks; and a stepper motor on a trolley end of the linear slide structure for causing the scanner/drum to slide transversely relative to the longitudinal direction of the tape medium.

The linear slide is preferably structured so that the scanner/drum is able to traverse the tape medium longitudinally between the opposed edges. In addition, the head stack of the scanner/drum preferably scans the tape medium housed in a UFB cartridge having main tape guides that lock upon loading into main tape guide locators provided in the base of the linear slide structure; and the UFB cartridge further includes slant tape guides for guiding the tape between spools that are offset to compensate for a helical scan wrap angle in the UFB cartridge. The UFB cartridge may also include a remote MIC located in an upper portion of the UFB cartridge adapted to store address locations of files on the tape medium. This MIC may also store data for operation in an AIT format Another feature relates to a method of using a linear slide scanner to perform helical scan serpentine recording/playback of select tacks on a flexible tape medium, comprising the steps of bringing a scanner/drum assembly of the linear sliding scanner device into contact with the flexible tape medium; advancing the flexible tape medium in either a forward or a reverse direction; advancing the linear sliding scanner in a linear direction transverse to the direction of travel of the flexible tape medium; and rotating a recording/playback head stack of the scanner/drum assembly to perform, in conjunction with the forward or reverse direction of travel of the flexible tape medium and the linear movement of the linear sliding scanner, helical scan serpentine recording/playback of the select tracks of the flexible tape medium. This method may additionally include a step of selecting an address of the select tracks using a remote MIC chip.

According to this method, the linear sliding scanner is preferably advanced in the linear direction via a stepper motor and the recording/playback head stack is rotated via a scanner motor. The stepper motor and the scanner motor are additionally preferably controlled by a tracking servo.

Yet another feature of the invention relates to a cartridge for operatively housing a recording/playback medium, comprising a first spool and a second spool located at offset positions inside a cartridge shell body; a recording/playback medium of a fixed width and length wound around the first and second spools; and a plurality of slant tape guides positioned between the first and second spools for guiding the recording/playback medium and for creating a helical scan tape wrap angle in connection with a plurality of main tape guides, the plurality of main tape guides being positioned between the first and second spools; wherein the cartridge shell body comprises: a plurality of pull out arm assemblies serving as enclosure doors for a bottom surface of the cartridge shell body, the pull out arm assemblies further serving as semicircular side walls of the cartridge shell body; a top plate; and opposing end plates formed perpendicular to the pull out arm assemblies and the top plate.

Preferably, semicircular portions of the pull out arm assemblies are formed around the spools so as to be rotatable, such that when the semicircular portions of the pull out arm assemblies are rotated around the spools, flat portions of the pull out arm assemblies serving as the bottom surface of the cartridge shell body rotate to expose the recording/playback medium. A shutter is additionally preferably formed in a bottom portion of each opposing end plate, the top portion of the shutter being hingedly attached to each opposing end plate so as to be pivotably opened to define an opening in each opposing end plate slightly larger in width than a width of a linear sliding scanner device used for helical scan recording/playback of the recording/playback medium.

Circular spool hubs are formed on one end of each spool so as to be accessible via an opening defined in one of the opposing end plates, the spool hubs containing receiving portions for receiving drive reel tables of a recording/ playback apparatus for transversely advancing the recording/playback medium in a forward and a reverse direction.

A remote MIC is additionally preferably located within the cartridge shell body for identifying sectors on the recording/playback medium for recording and/or playback.

Main tape guides and slant tape guides are preferably formed internally within the cartridge shell body.

Yet another feature of the invention relates to a method for performing a loading and a recording/playback operation on a cartridge operatively housing a recording/playback medium, comprising the steps of inserting the cartridge into a tape drive apparatus; rotating pull out arm assemblies serving as a bottom surface of the cartridge via a first motive means contained within the tape drive apparatus, thereby exposing a recording/playback medium wrapped around a pair of spools enclosed within the cartridge; pivotably opening shutters formed in a bottom portion of opposing end plates of the cartridge via a second motive means contained within the tape drive apparatus to define an opening in each opposing end plate slightly larger in width than a width of a linear sliding scanner device used for recording/playback of select tracks of the recording/playback medium; after the pull out arm assemblies have rotated fully and the shutters have opened fully, inserting and locking a plurality of main tape guides located within the cartridge into a corresponding plurality of main tape guide locators provided in a base portion of the linear sliding scanner device via a third motive means contained within the tape drive apparatus, the plurality of main tape guides used in conjunction with a plurality of slant tape guides and a pair of spools to create a helical scan tape wrap angle for helical scanning of the recording/playback medium; and bringing a scanner/drum assembly of the linear sliding scanner device into contact with the exposed recording/playback medium via the third motive means to allow the scanner/drum assembly to perform helical scan recording/playback of the select tracks of the recording/playback medium.

This method additionally preferably provides steps for transversely advancing the recording/playback medium via a tape drive motor provided in the tape drive apparatus and attached to drive reel tables inserted into spool hubs of the spools in either a forward or a reverse direction; advancing the linear sliding scanner device via a stepper motor in a linear direction transverse to the direction of travel of the recording/playback medium; and rotating a recording/playback head stack of the scanner/drum assembly via a scanner motor to perform, in conjunction with the linear movement of the linear sliding scanner device, helical scan serpentine recording/playback of the select tracks of the recording/playback medium. A remote MIC chip located within the cartridge may also preferably be used to identify sectors on the recording/playback medium for recording and/or playback. The tape drive motor, stepper motor, and scanner motor may also be controlled by a tracking servo.

These and other features of the invention will become more apparent from a review of the detailed description of the drawings and the written description that follow.

BRIEF DESCRIPTION OF THE DRAWINGS

FIG. 2 is a top view of a scanner for recording/playback of the tape of FIG. 1, wherein

DETAILED DESCRIPTION OF THE PREFERRED EMBODIMENTS

Figure 1:
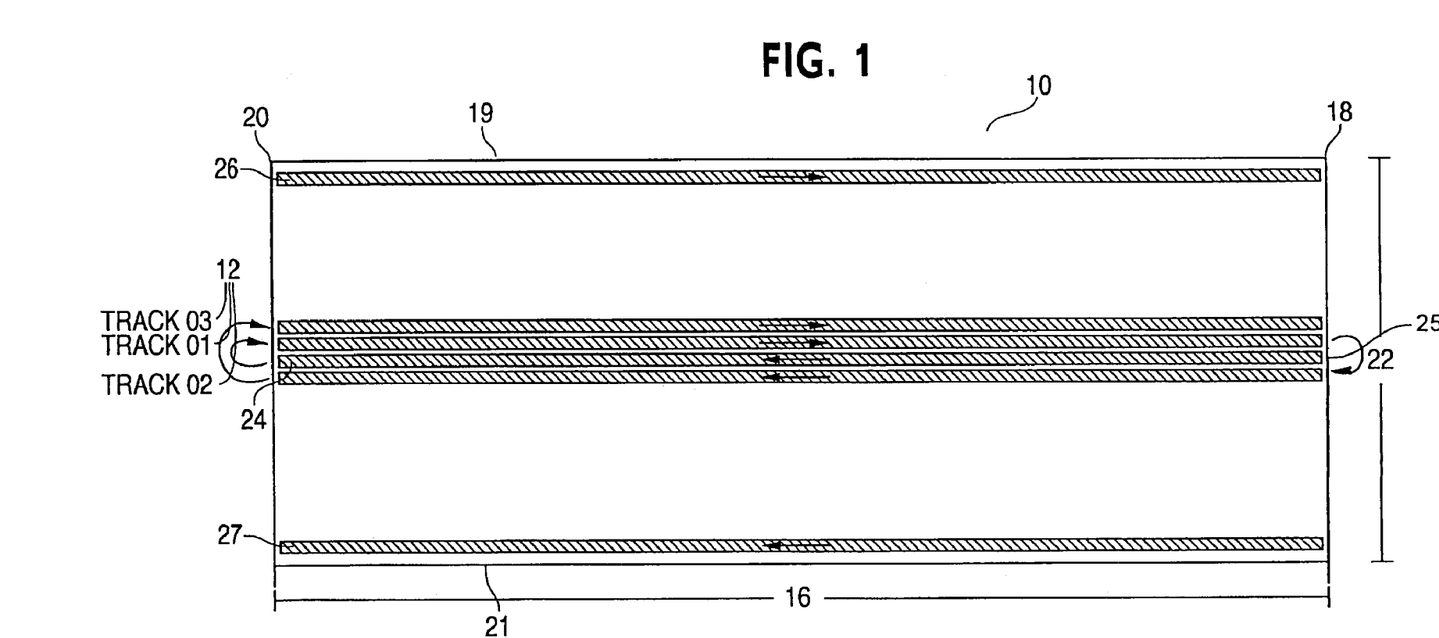
FIG. 1 is a plan view of a tape showing the helical scan pattern on each longitudinal track, and a serpentine pattern for a plurality of tracks, according to the invention.

FIG. 1 shows a recording/playback format on a tape, shown generally by the reference numeral 10, to provide a continuing alternating serpentine pattern for a plurality of recording tracks 12 suitable for helical scan recording/playback. This format was developed as a fast access data storage system that may be used for any data storage application using a recording medium such as a tape, CD, or disc. The UFB format, shown generally in FIG. 1, thus utilizes "helical scan" track write/read principles combined with a "serpentine" track pattern. Thus, the relatively short length of the tape and the novel Linear Sliding Scanner drive arrangement, shown in FIGS. 2 to 5, enables fast access to any physical location on the recording/playback media, such as the tape 10. For example, the tape 10 may be separated into a plurality of recording tracks 12 longitudinally adjacent one another, identified for access by, for example, use of a remote, or non-contact MIC chip to allow for file location and cartridge history information to be accessed quickly.

The tape 10 in FIG. 1 has a length 16 extending between a beginning of tape ("BOT") end 18, and an end of tape ("EOT") end 20. For convenience, the length 16 will be considered the effective recordable length, recognizing that the BOT end 18 and the EOT end 20 may also include tape lead and tape exit sections (not shown). The tape width 22 is defined transversely by an odd side edge 19 and an even side edge 21. For convenience, the odd side edge 19 is at an odd track side of the longitudinal center 25 of the tape, while the even side edge 21 is at an even track side of the longitudinal center of the tape.

A first recording track 24 is at the longitudinal center 25 of the tape 10. A plurality of tracks, denominated "Track 01", "Track 03" and so forth are on the odd track side of the tape 10 between the longitudinal center 25 of the tape and the odd side edge 19 of the tape. A "Max Odd Track" 26 is located adjacent the odd side edge 19 of the tape at a convenient distance to permit recording in the track without traversing the odd side edge 19 during recording/playback.

Similarly, a plurality of even tracks, denominated "Track 02" and so forth, are located between the longitudinal center 25 of the tape 10 and the even side edge 21. A "Max Even Track" 27 is located adjacent the even side edge 21 at a convenient distance to permit recording with traversing the even side edge 21.

A typical tape 10 has a preferable length of 100 meters, with a 12.75 cm. wide media and with a plurality of 6 mm. wide recording track bands, thus to provide a target data capacity of 1 Terabyte, at least a 10 fold increase of recording capacity for a tape of the type contemplated. It may be noted, however, that the track width and the total number of tracks are not fixed at this time, so that the representative numbers stated are those currently contemplated.

The longitudinally extending recording tracks 12 are recorded using helical scan techniques, well known to the art of recording and digital recording. A serpentine recording pattern is preferred, so that a novel combination of "helical scan" and "serpentine" track patterns is utilized. Preferably, the serpentine track pattern begins at Track 0 at the longitudinal center of the tape 10 at its BOT end, along a right-to-left direction until the EOT end is reached. As the recording approaches the EOT end, recording will stop, and the tape 10 will reverse direction and the linear sliding scanner 30 containing the recording/playback head stack 39 will shift a distance of one track toward the odd side edge 19, thus to permit another track, e.g. Track 01, to be recorded with a helical signal. Recording of Track 01 will be in a direction that is a reverse of Track 0, i.e. from the EOT end to the BOT end. Upon approaching the BOT end, the linear sliding scanner 30 will shift toward the rear of the drive that is toward the even side edge 21, to allow another band of tracks to be recorded. The process described may continue until the usable surface of the media is fully utilized, as shown in FIG. 1. Thus, as demonstrated in FIGS. 2A–2C, the linear sliding scanner 30 is able to linearly traverse among positions ranging from the maximum odd position near a first side of the tape, shown in FIG. 2B, to the maximum even position near a second, opposite side of the tape 10, show in FIG. 2C.

If recording is complete at a position intermediate the ends of the tape, at an identified sector, when recording is resumed, it will be located at a position adjacent the identified sector, and in a direction that was in process at the time recording was terminated. For example, a recording of Track 02 may terminate at a position such as Track 02A (not shown) formed while recording in a right to left matter, i.e. from the BOT end to the EOT end. When recording resumes, the recording of Track 02 may continue in the same right to left manner from the same position, i.e. Track 02A.

Another feature of the present invention relates to a linear sliding scanner 30, capable of sliding beneath the tape 10, and supporting at least one recording/playback head stack 39 with a scanner/drum assembly 40 for achieving the helical scan, serpentine recorded configurations described above on the tape 10. The linear sliding scanner 30 is best seen in FIGS. 3, 4 and 5, while the recording function is shown in FIGS. 2A, 2B, and 2C utilizing the linear sliding scanner 30 for recording on the tape 10.

Turning first to the structure of the linear sliding scanner 30, seen in FIGS. 3–5, this scanner 30 includes a casing having a right side wall 31 and an opposed left side wall 32, respectively closed at their ends by end members 33 and 34. The casing as described defines a linear slide distance 42 intermediate its ends 33, 34, to permit the scanner/drum assembly 40 with its recording/playback head stack 39 to traverse among a first location shown in FIG. 2A, and respective locations shown in FIGS. 2B and 2C, to perform recording on the tape or flexible media. The linear sliding scanner 30 and the scanner/drum assembly 40 are preferably formed to have approximately 28 cm. of media contact length.

The scanner/drum assembly 40 of the linear sliding scanner 30 as shown in FIG. 3 is responsive to a stepper motor 35 for causing the scanner/drum 40 and stack head 39 to respectively traverse selected tracks in the serpentine pattern described. The stepper motor 35, which is in operative rotatable connection with the base of the linear sliding scanner 30 via bearings 43, drives a lead screw 36 connected to an end trolley 37, while another opposed end trolley 41 is connected to the lead screw 36 at the opposed end mating with the end member 33. The stepper motor 35 is controlled by a tracking servo (not shown) cooperating with an MIC chip to determine stepping locations for the head stack 39 relative to the tape 10, as generally seen in FIGS. 2A, 2B, and 2C. Tape guide datums 45 are additionally provided in the base unit of the linear slide scanner 30 to help in guiding and positioning the tape 10 during recording/playback.

By the use of the stepper motor 35, the head stack 39 is positioned relative to a selected track on the tape 10, and its location is verified by the use of a memory cooperating with the MIC chip. When the head stack 39 is appropriately positioned relative to a selected track by the stepper motor 35 in the above-described manner, helical scanning occurs in that track to the extent the track is traversed generally orthogonally relative to the linear sliding scanner 30. Thus, as best seen in FIGS. 4 and 5, the stepper motor 35 results in causing the scanner/drum 40 to move transversely relative to the tape 10 for helical scan recording.

More specifically, the linear sliding scanner 30 has an ability to transversely slide beneath the tape 10, allowing the tape 10 to freely pass above the scanner/drum assembly 40 during the helical scan. To that end, air may be injected through the drum surface to provide an air film to assist in media movement over the scanner/drum assembly 40 and head stack 39.

Once the head stack 39 has been appropriately positioned relative to a selected track by the stepper motor 35 in the above-described manner, a scanner motor 38 initiates helical scanning of the recording/playback head stack 39. A feature of the invention is that, to control eccentricity of the drum unit 40, only the recording/playback head stack 39 is caused to rotate. As described above, air may be injected through the drum surface to provide an air film to assist in media movement over the rotating head stack 39.

Together, the lead screws 36, end trolleys 37, 41, and the scanner/drum 40 with the recording/playback head stack 39 responsive to the stepper motor 35 and scanner motor 38 define a linear sliding scanner 30 for accurately traversing the tape 10 for incremental, serpentine helical recording and/or playback as has been described.

Figure 6A:
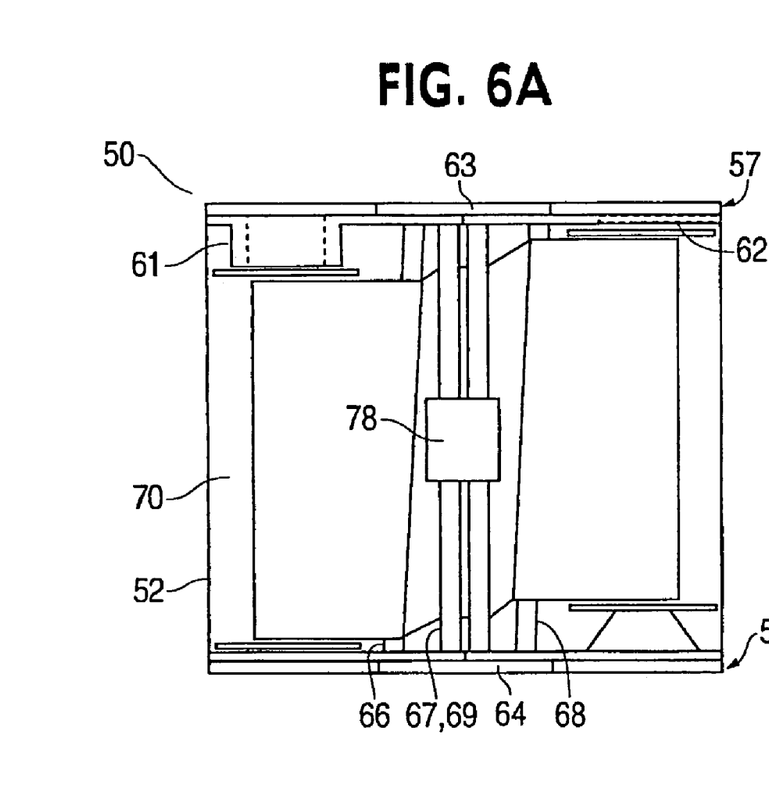
FIG. 6A is a top view of a UFB offset spool cartridge concept for housing the helical serpentine scanned tape according to the present invention.
Figure 6B:
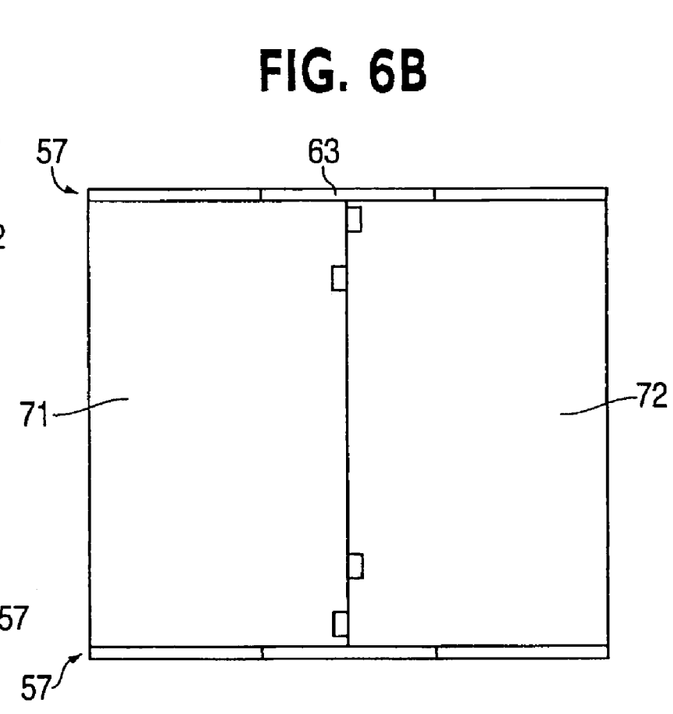
FIG. 6B is a bottom view of the spool cartridge.

A UFB offset spool cartridge concept will now be described with reference to FIGS. 6A–6B, 7A–7C and 8. As seen in FIG. 6A, a UFB spool cartridge 50 includes a cartridge shell body 52 having openings for housing and mounting a spool 55 at a location 61, and for housing and mounting a spool 56 at a location 62. The cartridge shell body 52 is defined by a top plate 70, two pull out arm assemblies 71, 72 serving as enclosure doors for a bottom surface of the spool cartridge 50 and further serving as semicircular right and left side walls, respectively closed at their ends by opposing end plates 57. When the spool cartridge 50 is in a closed shutter position 82, as demonstrated in previous FIG. 6B, the edges of the pull out arm assemblies 71, 72 meet at approximately the longitudinal center of the cartridge shell body 52 to effectively form the bottom surface of the cartridge shell body 52. However, when the spool cartridge 50 is in an open shutter position 84, as shown in FIG. 9, the pull out arm assemblies 71, 72 rotate around the spools 55, 56, respectively, to expose the tape 10 to the linear sliding scanner 30 for helical scanning.

Slant guides 66 and 68 are internally provided in the cartridge body 52 for guiding the tape 10 through a helical scan tape wrap angle, shown in FIG. 6A, relative to internally-provided main tape guides 67 and 69. In fact, the UFB spool cartridge 50 is preferably designed so as to incorporate all tape guides internally, thereby simplifying the overall design of the spool cartridge 50.

In addition, as best seen in the top view of FIG. 6A, the spools 55 and 56 are offset from one another to compensate for the helical scan tape wrap angle created by the slant guides 66, 68 and main tape guides 67, 69. A remote or non-contact MIC chip 78 is attached to the bottom surface of the top plate 70 of the cartridge shell body 52 for identifying and/or locating sectors on the tape 10 for recording and/or playback in the previously-described helical serpentine manner.

Figure 7A:
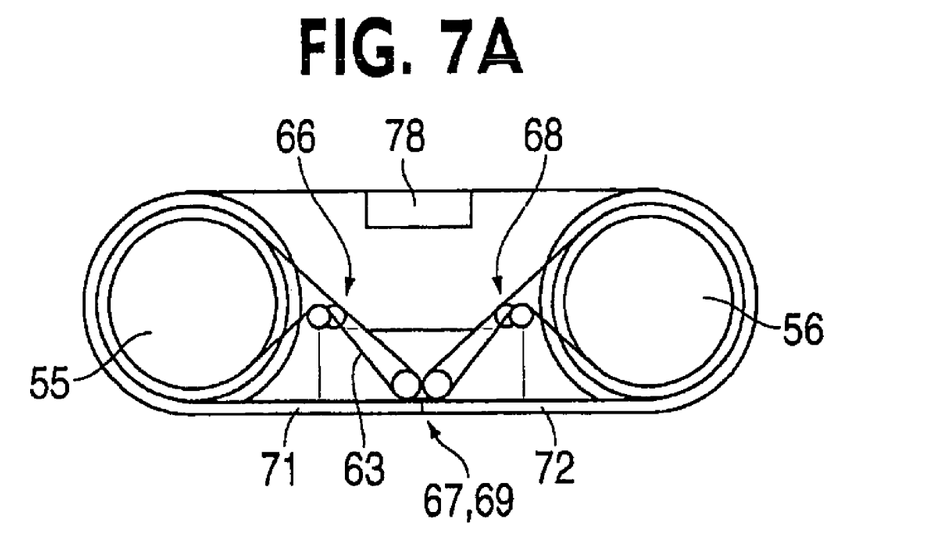
FIG. 7A is a diagrammatic end view of the UFB offset spool cartridge of FIGS. 6A–6B showing the essential components of the spool cartridge needed for housing and guiding the tape according to the present invention.
Figure 7B:
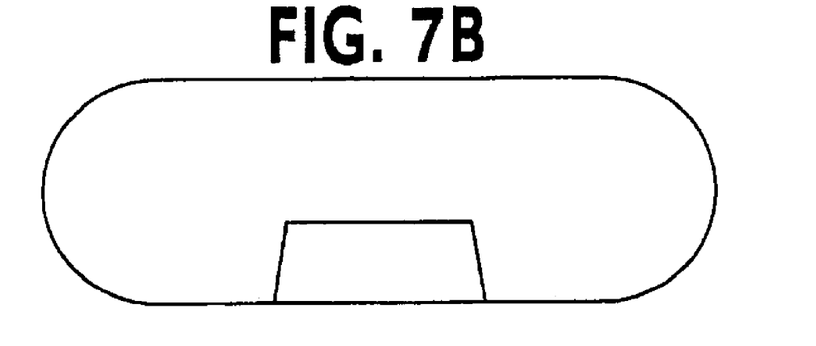
FIG. 7B is a front end view of the UFB offset spool cartridge of FIGS. 6A–6B.
Figure 7C:
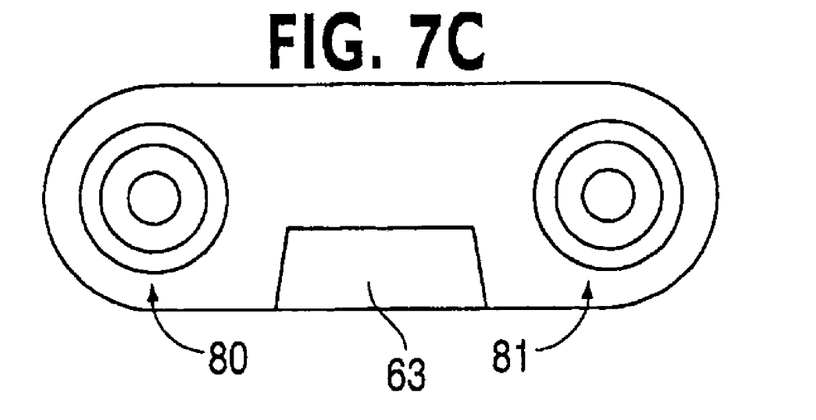
FIG. 7C is a rear end view of the UFB offset spool cartridge of FIGS. 6A–6B.

As seen in FIG. 7C, exposed spool hubs 80, 81 of the spools 55, 56, respectively, are provided in the rear end plate of the cartridge shell body 52. When the UFB spool cartridge 50 is loaded into a UFB recording/playback apparatus (not shown) for recording and/or playback, drive reel tables (not shown) of the UFB recording/playback apparatus are inserted into the exposed spool hubs 80, 81 and are controlled by a tracking servo (not shown) to drive the spool hubs 80, 81 and the spools 55, 56 connected thereto in a clockwise or counter-clockwise manner, thereby rotationally advancing the tape 10 in either a forward direction (from the BOT 18 to the EOT 20) or a reverse direction (from the EOT 20 to the BOT 18). Driving the tape 10 via the drive reel tables in this manner eliminates the need for conventional capstan and pinch roller assemblies, further simplifying the overall design of the offset cartridge 50.

Figure 8:
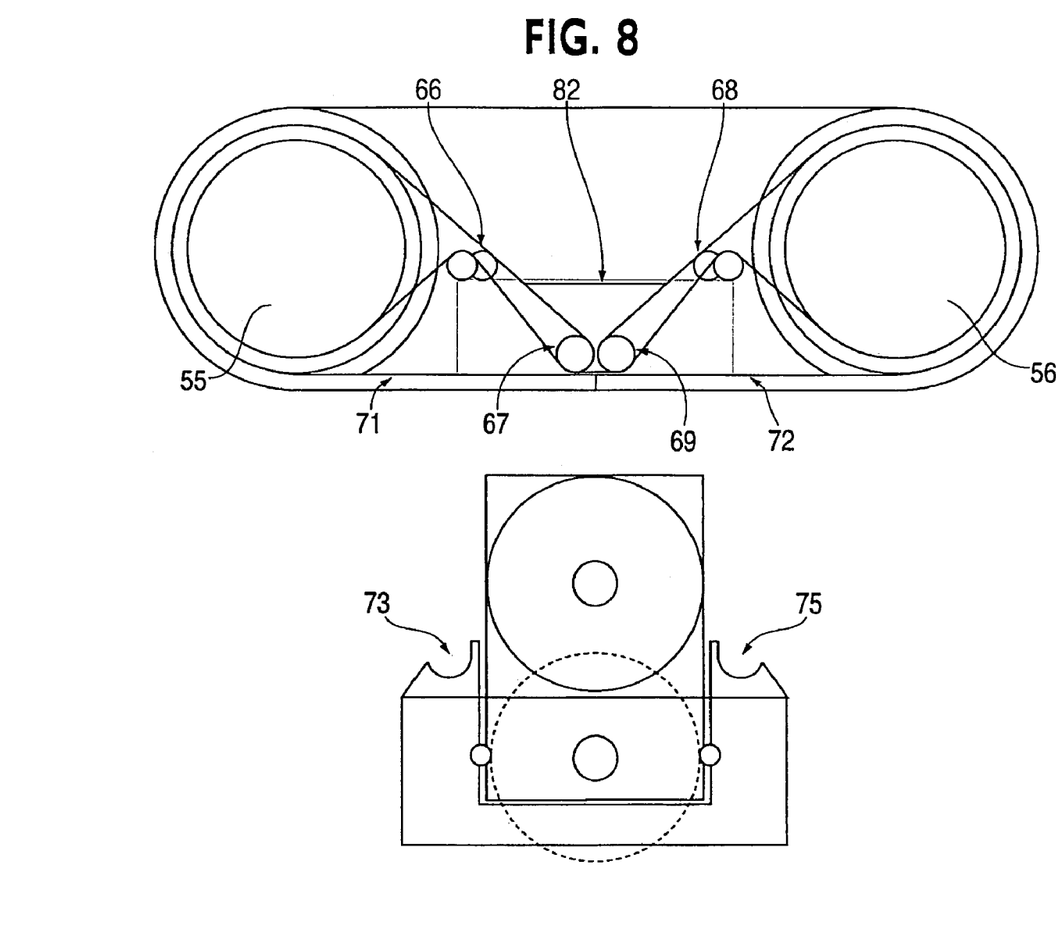
FIG. 8 is a diagrammatic top view of the UFB offset spool cartridge showing its shutter closed and positioned above the linear scanning assembly of FIG. 5.
Figure 9:
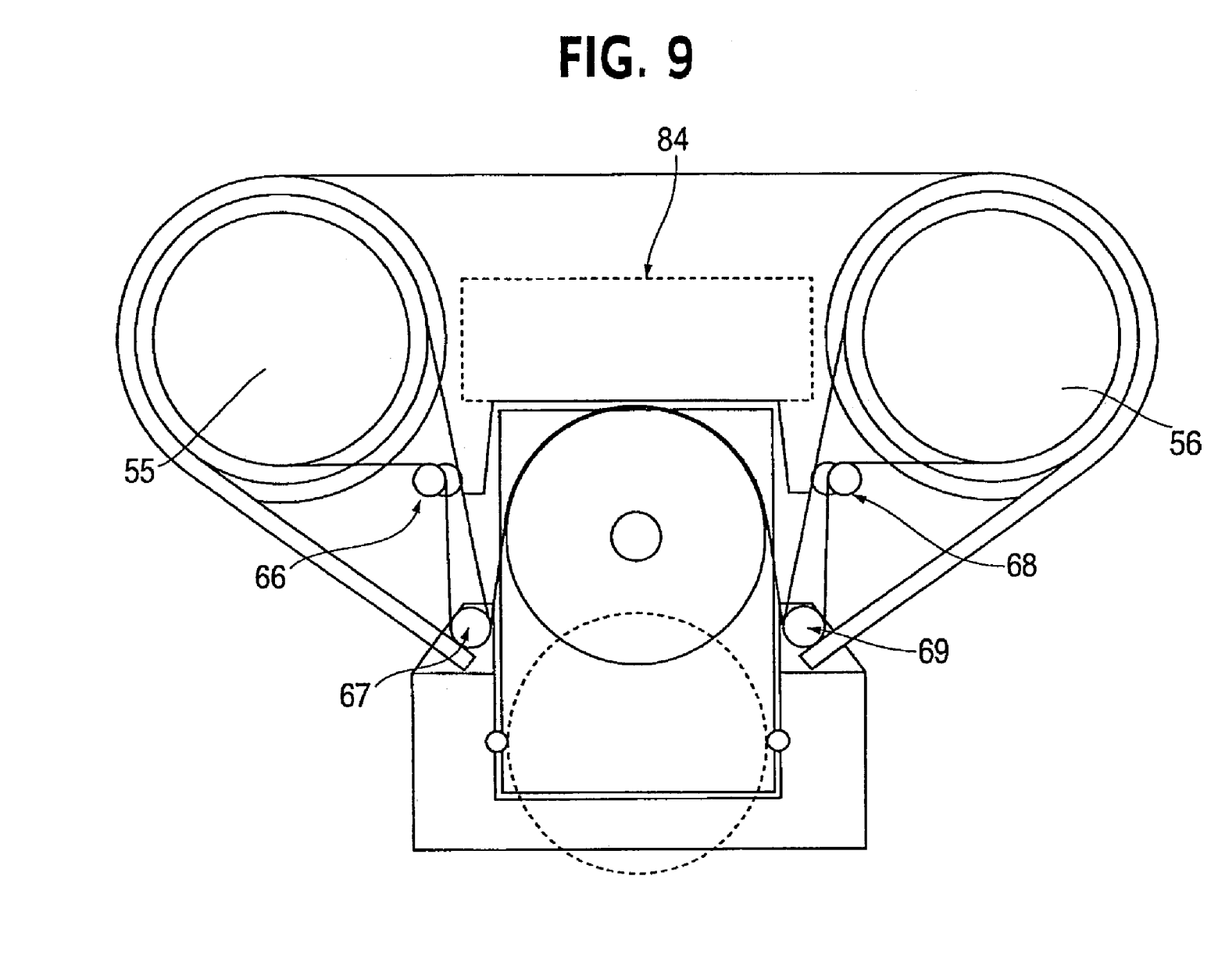
FIG. 9 is a diagrammatic top view of the UFB offset spool cartridge showing its shutter open to receive the linear scanning assembly of FIG. 5 for recording/playback of the tape.

Shutters 63, 64, seen in FIGS. 6A–6B, 7B–7C, 8 and 9, being slightly larger in width than that of the linear sliding scanner 30, are provided in the bottom center portion of each end plate 57. These shutters 63, 64 are fastened to the end plates 57 in any number of ways conventional in the art of fastening, including via elastomeric means, hinge means, etc. When the shutters 63, 64 are in a closed shutter position 82, as seen in FIG. 8, the shutters 63, 64 function to continuously form a portion of each end plate 57. However, when the shutters 63, 64 are brought into an open position during an opening/loading operation, seen in FIG. 9, an opening in the end plates 63, 64 slightly larger in width than that of the linear sliding scanner 30 is defined, thereby allowing the body of the linear sliding scanner 30 to be inserted inside the body of the UFB spool cartridge 50.

An opening/loading operation of the spool cartridge 50 will now be described with reference to FIGS. 8–9. Once the UFB spool cartridge 50 has been inserted into a UFB recording/playback apparatus (not shown), a drive motor apparatus (not shown) within the UFB recording/playback apparatus brings loading arms of the apparatus (not shown) into operative contact with the pull out arm assemblies 71, 72 and the shutters 63, 64 of the spool cartridge 50. Once in operative contact, the loading arms are driven by the drive motor of the recording/playback apparatus to pull open the pull out arm assemblies 71, 72 and to pivotably open the shutters 63, 64 of the spool cartridge 50. It should be noted that the UFB spool cartridge of the present invention has been designed to be compatible with conventional recording/playback apparatuses, including, in particular, conventional AIT tape drive apparatuses.

After the pull out arm assemblies 71, 72 and the shutters 63, 64 have been fully opened, thereby exposing the tape 10, the linear sliding scanner 30 is moved toward the interior of the spool cartridge 50 via the drive motor within the UFB recording/playback apparatus until the main tape guides 67, 69 of the spool cartridge 50 are inserted and lock into main guide locators 73, 75 provided in the base of the linear sliding scanner 30. Such a loading operation brings the head stack 39 of the scanner/drum assembly 40 into direct proximity with the exposed tape 10, such that the tape 10 now traverses between spool 55 and spool 56 in an irregular path defined in part by the spool 55, the slant guide 66, the main tape guide 67, the scanner/drum assembly 40, the main tape guide 69, the slant guide 68, and the spool 56.

Once the UFB spool cartridge 50 has been loaded into the UFB recording/playback apparatus, the pull out arm assemblies 71, 72 and shutters 63, 64 of the spool cartridge body 52 have been fully opened, and the main tape guides 67, 69 of the spool cartridge 50 have been inserted and locked into the main guide locators 73, 75 of the linear sliding scanner 30, thereby bringing the scanner/drum assembly 40 of the linear sliding scanner 30 into contact with the tape 10, a recording/playback operation may begin in the helical serpentine manner described earlier.

Although the principles and modes of operation of this invention have been explained and illustrated in preferred embodiments, in accordance with the provisions of the patent statutes, it must be understood that this invention may be practiced otherwise than is specifically explained and illustrated without departing from its spirit or scope.

What is claimed is:

1. A recording/playback recording medium, comprising:
an elongated, flexible recording/playback medium having a predetermined width and a predetermined length, together defining a recording/playback area capable of providing a plurality of elongated recording/playback tracks; and
information located on at least two tracks, a first track being recorded from the beginning of the first track in a first direction until the track is filled, a second track being recorded in a second opposite direction, said tracks being partitioned to define sectors having identifiable locations, said first, second, and subsequent tracks if necessary being recorded in a serpentine manner, said information recorded on said tracks being recorded by a helical scan.

2. The recording/playback recording medium as set forth in claim 1, wherein said first track is located at about the longitudinal center of said flexible medium, said second track is located toward a first odd side of said first track, a third track is located on a side opposite said first track toward a second even side of said first track, and so forth for a total number of tracks in said area.

3. A recording/playback medium as set forth in claim 1, further comprising a remote MIC chip for identifying sectors on said flexible medium for addressing data for recording and/or playback.

4. A recording/playback medium as set forth in claim 1, further including means for recording on selected tracks of said medium, said recording means including a recording/playback head stack and means for incrementing said head stack relative to a preselected recording track on said flexible recording medium.

5. A recording/playback medium as set forth in claim 4, further including means for recording/playback of helical scan signals on said preselected recording track.

6. A recording/playback medium as set forth in claim 4, further including means capable of recording/playback on any track between edges of said flexible recording medium.

7. A recording/playback medium as set forth in claim 4, further including a linear sliding apparatus having a scanner/drum assembly, said linear sliding apparatus being capable of linearly sliding transversely relative to said flexible recording medium, and said scanner/drum assembly being capable of helical recording on said preselected track.

8. A recording/playback medium as set forth in claim 7, further including a first motive means for incrementing said scanner/drum assembly relative to said preselected track, and a second motive means for driving said scanner/drum assembly for recording and/or playback.

9. A method of recording information on a recording/playback medium, comprising the steps of:
 providing an elongated flexible recording/playback medium having a predetermined width and a predetermined length together defining a recording/playback area having a plurality of tracks;
 recording information on at least two tracks in said area, including the steps of recording on a first track from a beginning of said tape to an end of said tape in a first direction, and recording on a second track from an end of said tape toward the beginning of said tape in a second, opposite direction, said tracks being partitioned to define sectors having identifiable locations, and
 further including a step of performing helical scan recording on preselected tracks.

10. The method as set forth in claim 9, further including a step of selecting an address of said identifiable locations using a remote MIC chip.

11. A method of recording information on a recording/playback medium, comprising the steps of:
 providing an elongated flexible recording/playback medium having a predetermined width and a predetermined length together defining a recording/playback area having a plurality of tracks;
 recording information on at least two tracks in said area, including the steps of recording on a first track from a beginning of said tape to an end of said tape in a first direction, and recording on a second track from an end of said tape toward the beginning of said tape in a second, opposite direction, said tracks being partitioned to define sectors having identifiable locations, and
 further including additional steps of helical scan recording in an additional plurality of tracks on said flexible recording medium in a serpentine manner.

* * * * *